(12) United States Patent
Hsieh et al.

(10) Patent No.: US 7,986,751 B2
(45) Date of Patent: Jul. 26, 2011

(54) CARRIER FREQUENCY OFFSET ESTIMATING DEVICE AND SYSTEM

(75) Inventors: Meng-Hung Hsieh, Taipei Hsien (TW); Chun-Fa Liao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 539 days.

(21) Appl. No.: 12/189,800

(22) Filed: Aug. 12, 2008

(65) Prior Publication Data

US 2009/0262865 A1    Oct. 22, 2009

(30) Foreign Application Priority Data

Apr. 16, 2008  (CN) .......................... 2008 1 0301141

(51) Int. Cl.
*H04L 27/00* (2006.01)
*H04L 27/28* (2006.01)
(52) U.S. Cl. ........................................ 375/326; 375/260
(58) Field of Classification Search .................. 375/260, 375/316, 324, 326; 455/75, 113
See application file for complete search history.

(56) References Cited

U.S. PATENT DOCUMENTS

| 7,257,168 | B2 * | 8/2007 | Goldstein et al. ............. 375/316 |
| 7,616,557 | B2 * | 11/2009 | Yeh et al. ....................... 370/208 |
| 2004/0141457 | A1 * | 7/2004 | Seo et al. ...................... 370/203 |
| 2004/0180635 | A1 * | 9/2004 | Choi et al. .................... 455/113 |
| 2006/0014494 | A1 | 1/2006 | Vanderperren et al. |

* cited by examiner

*Primary Examiner* — Khanh C Tran
(74) *Attorney, Agent, or Firm* — Frank R. Niranjan

(57) ABSTRACT

A carrier frequency offset estimating device for estimating frequency offsets of a multi-carrier signal includes a transforming circuit, a cosine effect eliminating circuit, a model creating circuit, and an estimating circuit. The transforming circuit receives the multi-carrier signal and transforms the multi-carrier signal to single-carrier signals. The cosine effect eliminating circuit eliminates cosine effects in the single-carrier signals to form single-carrier signals without the cosine effects. The model creating circuit creates linear data models according to the single-carrier signals without the cosine effects. The estimating circuit estimates the frequency offsets of the multi-carrier signal according to the linear data models. A carrier frequency offset estimating system is also provided.

19 Claims, 2 Drawing Sheets

CARRIER FREQUENCY OFFSET ESTIMATING DEVICE AND SYSTEM

BACKGROUND

1. Field of the Invention

Embodiments of the present disclosure relate to wireless communications and, particularly, to a carrier frequency offset estimating device and system.

2. Description of Related Art

Most wireless communication systems include signal transmitters and signal receivers. When a signal transmitter transmits carrier signals to a signal receiver over a communication channel, the signal receiver must know both starts and ends of the carrier signals in order to accurately modulate and demodulate the carrier signals. However, the carrier signals transmitted over the communication channel may be offset because of a delay effect of the communication channel and unmatchable frequencies of the oscillators between the signal transmitter and the signal receiver. In addition, these offsets of the carrier signals may make for Inter-Carrier Interferences (ICIs). Therefore, modulating and demodulating the carrier signals becomes increasingly difficult causing inaccuracy of the wireless communication system resulting in efficiency of the wireless communication system to be decreased. These ICIs significantly impact the efficiency of the wireless communication system. Therefore a system and a method to overcome the above mentioned problems are needed.

SUMMARY

A carrier frequency offset estimating device for estimating frequency offsets of a multi-carrier signal, including: a transforming circuit for receiving the multi-carrier signal, and transforming the multi-carrier signal into single-carrier signals having cosine effects; a cosine effect eliminating circuit for eliminating the cosine effects in the single-carrier signals to form single-carrier signals without the cosine effects; a model creating circuit for creating linear data models according to the single-carrier signals without the cosine effects; and an estimating circuit for estimating frequency offsets of the multi-carrier signal according to the linear data models.

Other advantages and novel features of the present disclosure will be drawn from the following detailed description, in which:

DETAILED DESCRIPTION CERTAIN INVENTIVE EMBODIMENTS

As used herein, the term, "carrier signal" is defined as an input signal that may be used to convey electronic information, such as voice or data, to be transmitted, for example by radio or light. The carrier signal, in one embodiment, may be represented as a formula having certain parameters. As used herein, the term, "neighboring carrier signals" is defined as carrier signals neighboring a particular carrier signal. For example, if a carrier signal may be represented as b(5), then neighboring carrier signals of b(5) may be b(4) or b(6) for example.

Figure 1:
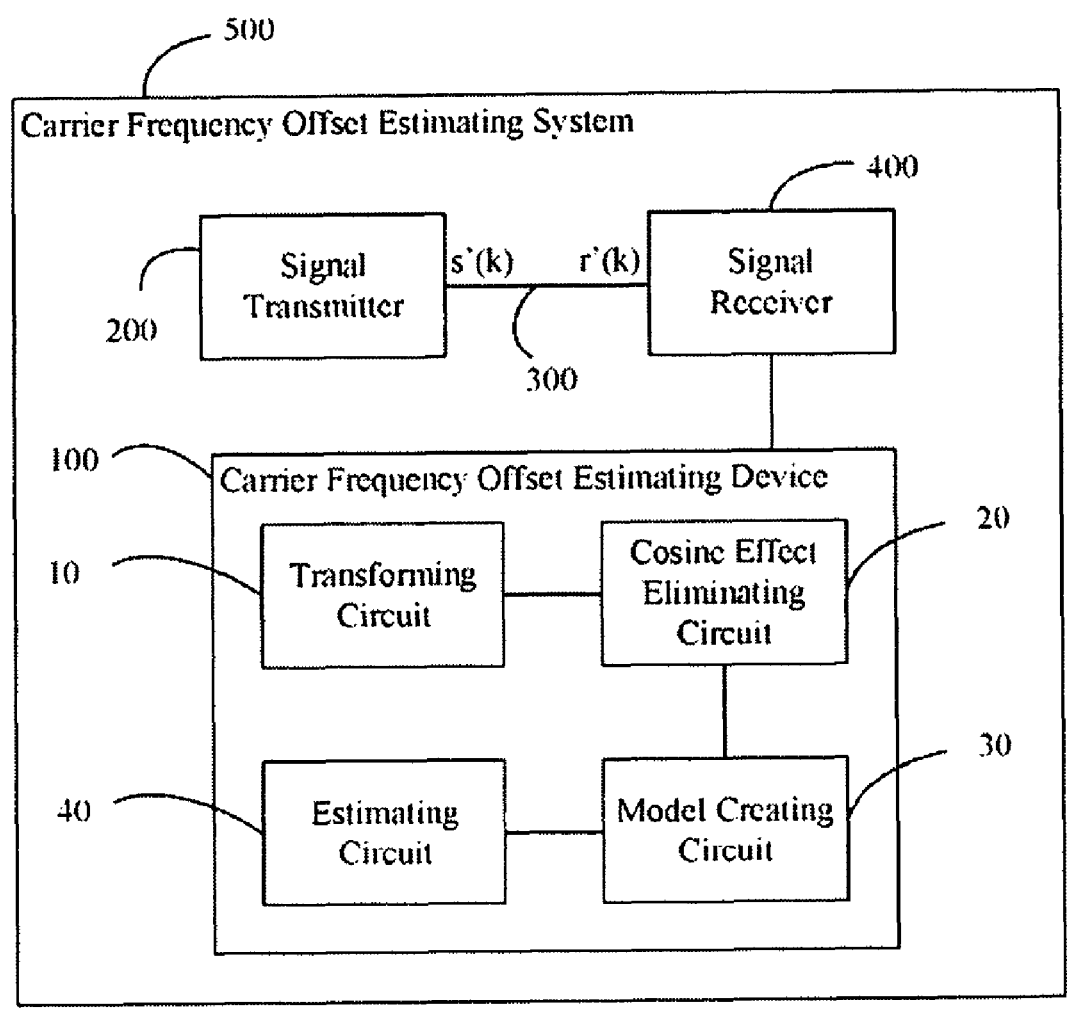
FIG. 1 is a block diagram of one embodiment of a carrier frequency offset estimating system in accordance with the present disclosure.

FIG. 1 is a block diagram of one embodiment of a carrier frequency offset estimating system 500 in accordance with the present disclosure. In one embodiment, the carrier frequency offset estimating system 500 includes a carrier frequency offset estimating device 100, a signal transmitter 200, a communication channel 300, and a signal receiver 400.

In one embodiment, the carrier frequency offset estimating device 100 communicates with the signal receiver 400 to estimate frequency offsets of a multi-carrier signal received by the signal receiver 400. In one embodiment, the multi-carrier signal may be orthogonal frequency division multiplexing (OFDM) signals. The communication channel 300 may be the additive white Gaussian noise (AWGN) channel.

In one embodiment, due to the discrepancy between oscillators of the signal transmitter 200 and the signal receiver 400, frequency offsets Δf exist between a multi-carrier signal of the signal transmitter 200 and that of the signal receiver 400. For example, when the signal transmitter 200 transmits a multi-carrier signal s(k) to the signal receiver 400 over the communication channel 300, the signal receiver 400 receives a multi-carrier signal r(k) which may be expressed by the following formula (1):

$$r(k) = s(k)e^{i\frac{2\pi \cdot \Delta f \cdot k}{N}} + n(k) \qquad (1)$$

wherein i indicates an imaginary number, N indicates a carrier number of the first multi-carrier signal s(k), and n(k) is a series of White Gaussian Noise. In one embodiment, the expectation of n(k) is 0, the variance of n(k) is $\sigma_n^2$, and the real and imaginary parts of n(k) are independent.

The signal transmitter 200 appends a training sequence c(k) to a multi-carrier signal s(k) to obtain a multi-carrier signal s'(k), and then transmits the multi-carrier signal s'(k) to the signal receiver 400 over the communication channel 300. In one embodiment, the training sequence c(k) may be the M-ary phase shift keying (PSK) signal. The signal transmitter 200 appends the training sequence c(k) to the multi-carrier signal s(k) by multiplying the multi-carrier signal s(k) by the training sequence c(k), and as a result, s'(k) is s(k)c(k). Specifically, the multi-carrier signal s(k) has been changed into the multi-carrier signal s(k)c(k). Then, the signal transmitter 200 transmits the multi-carrier signal s(k)c(k) to the signal receiver 400.

The signal receiver 400 receives the multi-carrier signal s'(k) from the signal transmitter 200 over the communication channel 300. In the process, the multi-carrier signal s'(k) has been transformed to r(kT$_s$), which is received by the signal receiver 400 and expressed as the following formula (2):

$$r(kT_s) = c(k)e^{i(2\pi \cdot \Delta f \cdot kT_s + \theta 0)} + n(kT_s) \qquad (2)$$

wherein c(k) may be the M-ary phase shift keying (PSK) signal, $|c(k)|^2 = 1$, $T_s$ is sampling time, and θ0 is an initial phase of r(kT$_s$).

The carrier frequency offset estimating device 100 includes a transforming circuit 10, a cosine effect eliminating circuit 20, a model creating circuit 30, and an estimating circuit 40.

The transforming circuit 10 receives a multi-carrier signal r'(k) from the signal receiver 400 and transforms it to single-carrier signals r"(k). The cosine effect eliminating circuit 20 eliminates cosine effects existing in the single-carrier signals r"(k). The model creating circuit 30 creates linear data models according to the single-carrier signals r"(k) without the cosine effects. The estimating circuit 40 estimates frequency offsets of the multi-carrier signal r'(k) according to the linear data models of the model creating circuit 30.

Figure 2:
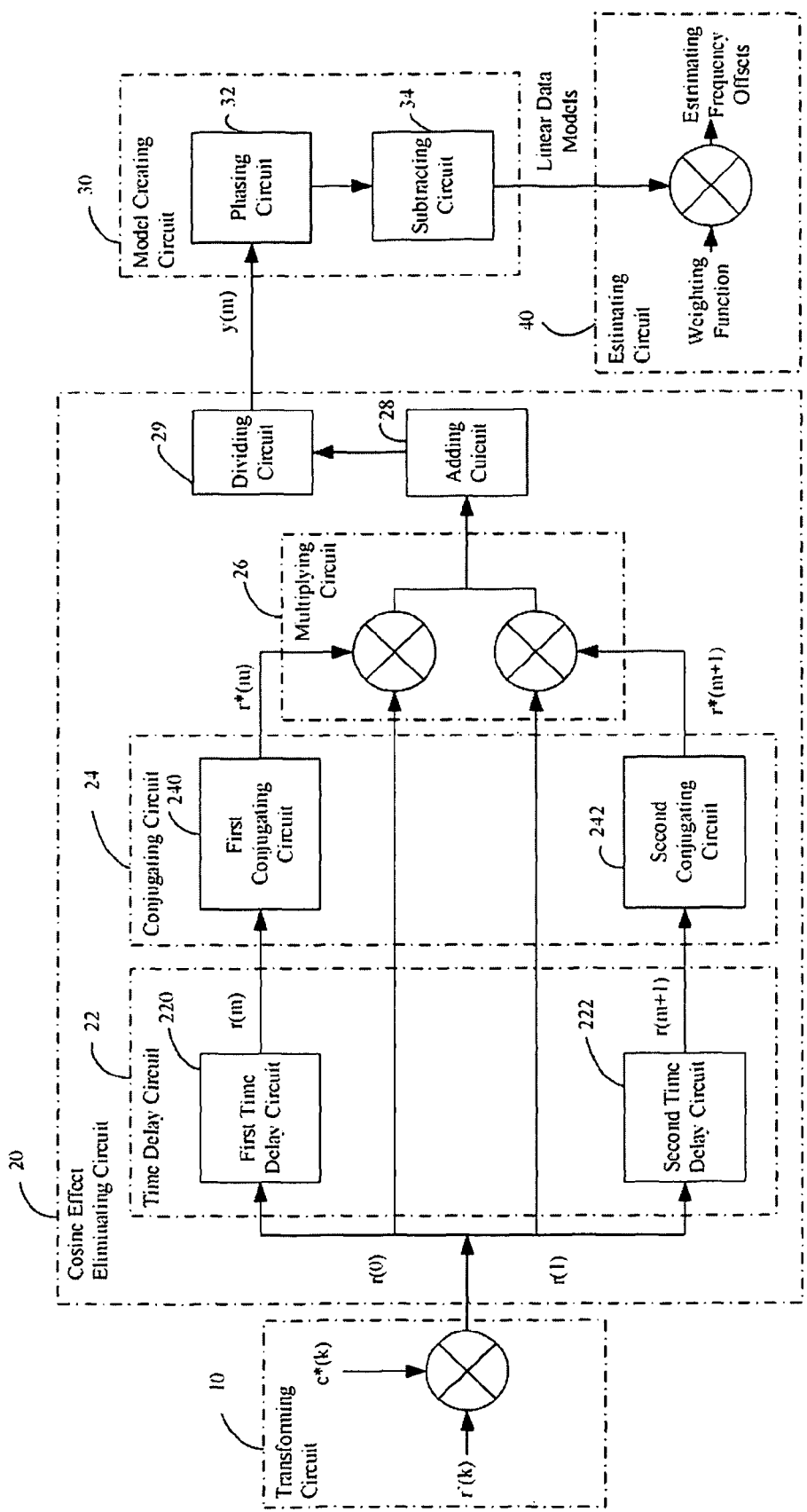
FIG. 2 is a detailed block diagram of the carrier frequency offset estimating system of FIG. 1.

FIG. 2 is a detailed block diagram of the carrier frequency offset estimating system 500 of FIG. 1. The carrier frequency offset estimating device 100 includes the transforming circuit 10, the cosine effect eliminating circuit 20, the model creating circuit 30, and the estimating circuit 40.

The transforming circuit 10 receives the multi-carrier signal r'(k) from the signal receiver 400 and transforms the multi-carrier signals r'(k) to single-carrier signals r"(k). In one embodiment, the multi-carrier signal r'(k) indicates $r(kT_s)$ when $T_s=1$ and $\theta_0=0$. The transforming circuit 10 transforms the multi-carrier signals r'(k) to single-carrier signals r"(k) by multiplying the multi-carrier signal r'(k) by the conjugate c*(k) of the training sequence c(k), and as a result, r"(k) is r'(k)c*(k). As such, the multi-carrier signal r'(k) is transformed to the single-carrier signals r"(k). By analyzing the formula (2), the relationship between r'(k) and c(k) would be eliminated if multiplying r'(k) by c*(k) to obtain r"(k) as shown in the following formula (3):

$$r''(k) = c(k) \cdot c^*(k) \cdot e^{i(2\pi \cdot \Delta f \cdot k)} + n(k) \cdot c^*(k) \qquad (3)$$
$$= e^{i(2\pi \cdot \Delta f \cdot k)} + n(k) \cdot c^*(k)$$
$$= e^{i(2\pi \cdot \Delta f \cdot k)} + \tilde{n}(k) \cdot c^*(k)$$

wherein $c(k) \cdot c^*(k)=1$, $\tilde{n}_k = n(k)c^*(k)$. Therefore, estimating the frequency offsets of the multi-carrier signal r'(k) can be simplified as estimating the frequency offsets of the single-carrier signals r"(k). Because different single-carrier signals have a different index k as shown in the formula (3), there are strong cosine effects existing in the single-carrier signals r"(k). Preferably, the cosine effects should be eliminated before estimating the frequency offsets for obtaining a better estimating result.

The cosine effect eliminating circuit 20 eliminates cosine effects in the single-carrier signals r"(k). In one embodiment, the cosine effect eliminating circuit 20 includes a time delay circuit 22, a conjugating circuit 24, a multiplying circuit 26, an adding circuit 28, and a dividing circuit 29. The cosine effect eliminating circuit 20 multiplies a first single-carrier signal r(0) and a second single-carrier signal r(1) respectively by two delayed single-carrier signals r(m) and r(m+1), shown in the following formula (4):

$$r^*(0)r(m) = e^{i \cdot 2\pi \cdot \Delta f \cdot m}[1 + n^*(0) + n(m) + n^*(0)n(m)]$$
$$r^*(1)r(1+m) = e^{i \cdot 2\pi \cdot \Delta f \cdot m}[1 + n^*(1) + n(1+m) + n^*(1)n(1+m)] \qquad (4)$$

wherein r(0) indicates r"(k) when k=0, r(1) indicates r"(k) when k=1, r(m) indicates delaying r(0) for m time period, and r(m+1) indicates delaying r(1) for m time period.

By analyzing the formula (4), the exponentials of the multiplying result r*(0)r(m) is equal to that of the multiplying result r*(1)r(m+1). The average of r*(0)r(m) and r*(1)r(m+1) can be expressed as the following formula (5):

$$y(m) = \frac{r^*(0)r(m) + r^*(1)r(1+m)}{2} \qquad (5)$$

wherein m=0, 1, 2, ..., N−2, and N is the number of the single-carriers. As such, the cosine effects existing in the single-carrier signals r"(k) could be eliminated.

The time delay circuit 22 delays two neighboring single-carrier signals transformed by the transforming circuit 10 for a predefined time period. In one embodiment, the time delay circuit 22 calculates two delayed single-carrier signals r(m) and r(m+1), which are delayed for m time periods relative to the first single-carrier signal r(0) and the second single-carrier signal r(1), respectively. The time delay circuit 22 includes a first time delay circuit 220 and a second time delay circuit 222. The first time delay circuit 220 calculates the delayed single-carrier signal r(m) according to the first single-carrier signal r(0). The second time delay circuit 222 calculates the delayed single-carrier signal r(m+1) according to the second single-carrier signal r(1).

The conjugating circuit 24 conjugates the delayed single-carrier signals for the predefined time period from the time delay circuit 22. In one embodiment, the conjugating circuit 24 conjugates two delayed single-carrier signals r(m) and r(m+1) to obtain the conjugation r*(m) and r*(m+1) of two delayed single-carrier signals r(m) and r(m+1). The conjugating circuit 24 includes a first conjugating circuit 240 and a second conjugating circuit 242. The first conjugating circuit 240 conjugates the delayed single-carrier signal r(m) to obtain the conjugation thereof r*(m). The second conjugating circuit 242 conjugates the delayed single-carrier signal r(m+1) to obtain the conjugation thereof r*(m+1).

The multiplying circuit 26 multiplies two neighboring single-carrier signals transformed by the transforming circuit 10 respectively by two conjugated neighboring single-carrier signals from the conjugating circuit 24. Specifically, the multiplying circuit 26 multiplies the first single-carrier signal r(0) by the delayed single-carrier signal thereof r*(m) and multiplies the second single-carrier signal r(1) by the delayed single-carrier signal thereof r*(m+1). In one embodiment, the multiplying circuit 26 includes two multipliers for calculating r(0)r*(m) and r(1)r*(m+1), respectively.

In another embodiment of the present disclosure, because r(0)r*(m) is equal to r*(0)r(m), and r(1)r*(m+1) is equal to r*(1)r(m+1), the conjugating circuit 24 may further conjugate the single-carrier signals transformed by the transforming circuit 10 so as to calculate the conjugation r*(0) of the first single-carrier signal r(0) and the conjugation r*(1) of the second single-carrier signal r(1). Additionally, the multiplying circuit 26 may multiply two neighboring single-carrier signals delayed by the time delay circuit 22 respectively by two neighboring single-carrier signals conjugated by the conjugating circuit 24 so as to calculate r*(0)r(m) and r*(1)r(m+1).

The adding circuit 28 adds two neighboring single-carrier signals r(0)r*(m) and r(1)r*(m+1) generated by the multiplying circuit 26 to obtain single-carrier sum signals r(0)r*(m)+r(1)r*(m+1) or r*(0)r(m)+r*(1)r(m+1).

The dividing circuit 29 divides the single-carrier sum signals r(0)r*(m)+r(1)r*(m+1) or r*(0)r(m)+r*(1)r(m+1) by 2 to obtain single-carrier quotient signals y(m) shown in the formula (5). As such, the cosine effects existing in the single-carrier signals r"(k) have been eliminated.

The model creating circuit 30 creates linear data models Δ(m) according to the single-carrier quotient signals y(m) without the cosine effects. The model creating circuit 30 includes a phasing circuit 32 and a subtracting circuit 34. In one embodiment, by analyzing the formulas (4) and (5), the formula (5) can be expressed as the following formula (6):

$$y(m) = e^{i \cdot 2\pi \cdot \Delta f \cdot m} + z(m) \qquad (6)$$

wherein noises are all expressed as z(m). Referring to the Tretter noise approximation theory, the formula (6) can be expressed as the following, formula (7):

$$y(m) \approx e^{j \cdot 2\pi \cdot \Delta f \cdot m + \frac{\tilde{u}^*(0)+\tilde{u}(m)+\tilde{u}^*(1)+\tilde{u}(m+1)}{2}} \quad (7)$$

wherein ũ(k) represents a colored noise, and ũ*(k) is the conjugation of ũ(k).

By retrieving the phases of y(m) and y(m+1) expressed in the formula (7) and obtaining its difference, a series of linear data models Δ(m) containing frequency offsets is acquired and expressed as the following formula (8):

$$\Delta(m) = \arg[y(m+1)] - \arg[y(m)] \quad (8)$$
$$= 2\pi \cdot \Delta f + \frac{\tilde{u}(m+2) - \tilde{u}(m)}{2}$$

wherein m indicates the number of linear data models.

The phasing circuit 32 retrieves phases of two neighboring single-carrier quotient signals generated by the dividing circuit 29 to obtain two phased neighboring single-carrier quotient signals arg[y(m+1)] and arg[y(m)].

The subtracting circuit 34 subtracts the phases of two neighboring single-carrier quotient signals generated by the phasing circuit 32 to obtain arg[y(m+1)]−arg[y(m)], namely, the linear data models Δ(m). In the process, the model creating circuit 30 has created the linear data models Δ(m).

The estimating circuit 40 estimates the frequency offsets of the multi-carrier signal r'(k) according to the linear data models Δ(m). In one embodiment, the estimating circuit 40 multiplies the linear data models Δ(m) created by the model creating circuit 30 by a weighting function for estimating the frequency offsets of the multi-carrier signal r'(k) received by the signal receiver 400. In one embodiment, the weighting function may be $$\frac{A^T C^{-1}}{A^T C^{-1} A},$$

wherein A is an m×1 order matrix of 1, $A^T$ is the transpose of A, C is an m×m order covariance matrix, and $C^{-1}$ is the reflexive matrix of C.

Therefore, the carrier frequency offset estimating device 100 has estimated the frequency offsets of the multi-carrier signal r'(k) received by the signal receiver 400. According to the Maximum Likelihood Theorem, the estimator of the carrier frequency offset estimating device 100 can be expressed as the following formula (9):

$$\hat{\omega}_0 = \frac{A^T C^{-1} \Delta(m)}{A^T C^{-1} A} \quad (9)$$

The carrier frequency offset estimating system 500 and the carrier frequency offset estimating device 100 of the present disclosure employ several simple circuits, such as the time delay circuit 22, the conjugation circuit 24, the multiplying circuit 26, the adding circuit 28, and the dividing circuit 29 to conveniently estimate the frequency offsets of a multi-carrier signal r'(k) and eliminate the cosine effects of the estimators, thereby effectively improving the efficiency of the OFDM system.

Although the features and elements of the present disclosure are described in the embodiment in particular combinations, each feature or element can be used alone or in other various combinations within the principles of the disclosure to the full extent indicated by the broad general meaning of the terms in which the appended claims are expressed.

What is claimed is:

1. A carrier frequency offset estimating device for estimating frequency offsets of a multi-carrier signal, comprising:
    a transforming circuit for receiving the multi-carrier signal, and transforming the multi-carrier signal into single-carrier signals having cosine effects;
    a cosine effect eliminating circuit for eliminating the cosine effects in the single-carrier signals to form single-carrier signals without the cosine effects;
    a model creating circuit for creating linear data models according to the single-carrier signals without the cosine effects; and
    an estimating circuit for estimating frequency offsets of the multi-carrier signal according to the linear data models.

2. The carrier frequency offset estimating device as claimed in claim 1, wherein the multi-carrier signal comprises an orthogonal frequency division multiplexing signal.

3. The carrier frequency offset estimating device as claimed in claim 1, wherein the transforming circuit further multiplies the multi-carrier signal by a conjugation of a training sequence to transform the multi-carrier signal into the single-carrier signals.

4. The carrier frequency offset estimating device as claimed in claim 3, wherein the training sequence comprises M-ary phase shift keying signals.

5. The carrier frequency offset estimating device as claimed in claim 1, wherein the cosine effect eliminating circuit comprises:
    a time delay circuit for delaying two neighboring single-carrier signals transformed by the transforming circuit for a predefined time period;
    a conjugating circuit for conjugating the two delayed neighboring single-carrier signals for the predefined time period from the time delay circuit;
    a multiplying circuit for multiplying the two neighboring single-carrier signals transformed by the transforming circuit respectively by two conjugated neighboring single-carrier signals from the conjugating circuit;
    an adding circuit for adding the two neighboring single-carrier signals multiplied by the multiplying circuit to obtain single-carrier sum signals; and
    a dividing circuit for dividing the single-carrier sum signals by two to obtain single-carrier quotient signals.

6. The carrier frequency offset estimating device as claimed in claim 5, wherein the conjugating circuit further conjugates two neighboring single-carrier signals transformed by the transforming circuit.

7. The carrier frequency offset estimating device as claimed in claim 6, wherein the multiplying circuit further multiplies two delayed neighboring single-carrier signals for the predefined time period respectively by two conjugated neighboring single-carrier signals from the conjugating circuit.

8. The carrier frequency offset estimating device as claimed in claim 5, wherein the model creating circuit comprises:
    a phasing circuit for retrieving phases of the two neighboring single-carrier quotient signals generated by the dividing circuit; and
    a subtracting circuit for subtracting the phases of the two neighboring single-carrier quotient signals to create the linear data models.

9. The carrier frequency offset estimating device as claimed in claim 1, wherein the estimating circuit further multiplies the linear data models by a weighting function to estimate the frequency offsets of the multi-carrier signal.

10. The carrier frequency offset estimating device as claimed in claim 8, wherein the weighting function comprises $$\frac{A^T C^{-1}}{A^T C^{-1} A},$$

and A is an m×1 order matrix of 1, $A^T$ is the transpose of A, C is an m×m order covariance matrix, and $C^{-1}$ is the reflexive matrix of C.

11. A carrier frequency offset estimating system, comprising:
   a signal transmitter for appending a training sequence to a multi-carrier signal and transmitting the multi-carrier signal with the training sequence over a communication channel;
   a signal receiver for receiving the multi-carrier signal with the training sequence from the signal transmitter over the communication channel; and
   a carrier frequency offset estimating device for estimating frequency offsets of multi-carrier signal received by the signal receiver, the carrier frequency offset estimating device comprising:
      a transforming circuit for transforming the multi-carrier signal received by the signal receiver to single-carrier signals having cosine effects;
      a cosine effect eliminating circuit for eliminating the cosine effects in the single-carrier signals to form single carrier effects without the cosine effects;
      a model creating circuit for creating linear data models according to the single-carrier signals without the cosine effects; and
      an estimating circuit for estimating the frequency offsets of the multi-carrier signal with the training sequence according to the linear data models.

12. The carrier frequency offset estimating system as claimed in claim 11, wherein the communication channel comprises an additive white Gaussian noise channel.

13. The carrier frequency offset estimating system as claimed in claim 11, wherein the transforming circuit further multiplies the multi-carrier signal received by the signal receiver by a conjugation of the training sequence to transform the multi-carrier signal received by the signal receiver to the single-carrier signals.

14. The carrier frequency offset estimating system as claimed in claim 11, wherein the cosine effect eliminating circuit comprises:
   a time delay circuit for delaying the two neighboring single-carrier signals transformed by the transforming circuit for a predefined time period;
   a conjugating circuit for conjugating the two delayed neighboring single-carrier signals from the time delay circuit;
   a multiplying circuit for multiplying the two neighboring single-carrier signals transformed by the transforming circuit respectively by the two conjugated neighboring single-carrier signals from the conjugating circuit;
   an adding circuit for adding the two multiplied neighboring single-carrier signals from the multiplying circuit to obtain single-carrier sum signals; and
   a dividing circuit for dividing the single-carrier sum signals by two to obtain single-carrier quotient signals.

15. The carrier frequency offset estimating system as claimed in claim 14, wherein the conjugating circuit further conjugates the two neighboring single-carrier signals transformed by the transforming circuit.

16. The carrier frequency offset estimating system as claimed in claim 15, wherein the multiplying circuit further multiplies the two delayed neighboring single-carrier signals from the time delay circuit respectively by two conjugated neighboring single-carrier signals from the conjugating circuit.

17. The carrier frequency offset estimating system as claimed in claim 14, wherein the model creating circuit comprises:
   a phasing circuit for retrieving phases of the two neighboring single-carrier quotient signals generated by the dividing circuit; and
   a subtracting circuit for subtracting the phases of two neighboring single-carrier quotient signals to create the linear data models.

18. The carrier frequency offset estimating system as claimed in claim 11, wherein the estimating circuit further multiplies the linear data models by a weighting function to estimate the frequency offsets of the multi-carrier signal.

19. The carrier frequency offset estimating system as claimed in claim 18, wherein the weighting function comprises $$\frac{A^T C^{-1}}{A^T C^{-1} A},$$

and A is an m×1 order matrix of 1, $A^T$ is the transpose of A, C is an m×m order covariance matrix, and $C^{-1}$ is the reflexive matrix of C.

* * * * *